US012617635B2

(12) United States Patent
Wu

(10) Patent No.: US 12,617,635 B2
(45) Date of Patent: *May 5, 2026

(54) LASER MARKING FEEDING DEVICE

(71) Applicants: DINKLE ENTERPRISE CO., LTD., New Taipei City (TW); DINKLE ELECTRIC MACHINERY (CHINA) CO., LTD., Kunshan City (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan City (CN); LI YANG ELECTRIC MACHINERY (DONGGUAN) CO., LTD., Dong Guan City (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/276,329

(22) Filed: Jul. 22, 2025

(65) Prior Publication Data

US 2025/0346446 A1 Nov. 13, 2025

Related U.S. Application Data

(63) Continuation of application No. 18/638,640, filed on Apr. 17, 2024, now Pat. No. 12,398,003.

(51) Int. Cl.
*B65G 59/06* (2006.01)
*B41J 2/435* (2006.01)
(Continued)

(52) U.S. Cl.
CPC ............ *B65G 59/068* (2013.01); *B41J 2/435* (2013.01); *B41J 11/0095* (2013.01); *B41J 13/08* (2013.01); *B65G 2203/0233* (2013.01)

(58) Field of Classification Search
CPC ........ B41J 13/08; B41J 2/435; B41J 11/0095; B65H 3/042; B65H 2301/42322;
(Continued)

(56) References Cited

U.S. PATENT DOCUMENTS 12,398,003 B1 * 8/2025 Wu ......................... B41J 2/435

* cited by examiner

*Primary Examiner* — Gregory W Adams
(74) *Attorney, Agent, or Firm* — HDLS IPR SERVICES; Chun-Ming Shih

(57) ABSTRACT

A laser marking feeding device used for multiple parts to be marked includes a device body, a laser marking machine, a transmitting mechanism and a part blocking structure. The device body is disposed with a processing area and a feeding area. The transmitting mechanism is installed in the processing area and the feeding area and disposed under the laser marking machine. The transmitting mechanism is used for transmitting the parts to be marked from the feeding area to the processing area. The multiple parts to be marked are stacked on the transmitting mechanism of the feeding area. The part blocking structure is disposed between the processing area and the feeding area and disposed over the transmitting mechanism. An interval greater than a thickness of one part to be marked and less than thicknesses of two parts to be marked exists between the part blocking structure and the transmitting mechanism.

10 Claims, 10 Drawing Sheets

(51) Int. Cl.
  *B41J 11/00*              (2006.01)
  *B41J 13/08*              (2006.01)
(58) Field of Classification Search
  CPC  ...  B65H 1/06; B65H 3/34; B65H 3/56; B65G
          2203/0233; B65G 59/067; B65G 59/068;
                                  B65G 59/107
  See application file for complete search history.

1

LASER MARKING FEEDING DEVICE

CROSS-REFERENCE TO RELATED APPLICATION

This application is a continuing application of U.S. patent application Ser. No. 18/638,640, filed on Apr. 17, 2024, and entitled "LASER MARKING FEEDING DEVICE". The entire disclosures of the above application are all incorporated herein by reference.

BACKGROUND

Technical Field

The disclosure relates to a part feeding device of mechanical process, particularly to a laser marking feeding device.

Related Art

Laser marking uses laser to form characters, patterns and other marks on surfaces of objects. The principle is to engrave a surface of an object with laser. Depending on the power and beam density of laser, different engraving texture effects can be produced.

In addition, the laser marking process usually uses an automatic feeding device to feed the parts to be marked to the place under the laser marking machine one by one, and then uses the laser marking machine to engrave the surfaces of the parts to be marked. Finally, the parts which have been marked are removed from the part belt to finish the laser marking process.

However, the above-mentioned automatic feeding device ensures that the parts to be marked are sent to the place under the laser marking machine one piece at a time, which often leads to problems such as the transmitting path of the automatic feeding device being too long or the device structure being complex. Therefore, how to simplify the transmitting path or structure of the automatic feeding device is the research and development focus of the automatic feeding device manufacturers.

In view of this, the inventors have devoted themselves to the above-mentioned prior art, researched intensively and cooperated with the application of science to try to solve the above-mentioned problems. Finally, the invention which is reasonable and effective to overcome the above drawbacks is provided.

SUMMARY

The disclosure provides a laser marking feeding device, which uses when the multiple parts to be marked are stacked on the transmitting mechanism in the feeding area, only the lowest one of the parts to be marked can be driven by the transmitting mechanism to move to pass through the interval, and the rest of the multiple parts to be marked are blocked in the feeding area by the part blocking structure to make the laser marking feeding device of the disclosure have advantages of simplifying the transmitting path of the automatically feeding or the device structure.

In embodiments of the disclosure, the disclosure provides a laser marking feeding device used for multiple parts to be marked. The laser marking feeding device includes: a device body, disposed with a processing area and a feeding area disposed on a side of the processing area; a laser marking machine, installed in the processing area; a transmitting mechanism, installed in the processing area and the feeding area and disposed under the laser marking machine, used for transmitting the parts to be marked from the feeding area to the processing area along a horizontal path, the transmitting mechanism comprises two driving wheels and two driven wheels, which are pivoted to the device body, and two tracks separately wrapping outsides of each driving wheel and each driven wheel and, following each driving wheel to rotate, and parallel to each other at interval; and a part blocking structure, disposed between the processing area and the feeding area and disposed over the transmitting mechanism, a height of the part blocking structure being greater than thicknesses of the multiple parts to be marked, and an interval greater than a thickness of one of the parts to be marked and less than thicknesses of two of the parts to be marked existing between the part blocking structure and the transmitting mechanism; wherein the part to be marked comprises two transverse part belts formed on two opposite sides thereof, one of the two driving wheels, one of the two driven wheels, and one of the two tracks are arranged on a left side of the processing area and the feeding area, the other driving wheel, the other driven wheel, and the other track are arranged on a right side of the processing area and the feeding area, and the two transverse part belts are parallel to each other and respectively placed on the two tracks; wherein the part blocking structure comprises two upright blocking plates fixed to the device body and disposed over the two tracks, the height is a height of each upright blocking plate, and the interval is formed between the two tracks and the two upright blocking plates; wherein when the multiple parts to be marked are stacked on the transmitting mechanism in the feeding area, only the lowest one of the parts to be marked can be driven by the transmitting mechanism to move from the feeding area to the processing area via the interval along the horizontal path, and the rest of the multiple parts to be marked are blocked in the feeding area by the part blocking structure.

Accordingly, the laser marking feeding device of the disclosure adopts the transmitting mechanism to transmit the parts to be marked from the feeding area to the processing area along the horizontal path, and then uses that the height of the part blocking structure is greater than the thicknesses of the multiple parts to be marked and that an interval greater than a thickness of one part to be marked and less than thicknesses of two parts to be marked exists between the part blocking structure and the transmitting mechanism, after that, when the multiple parts to be marked are stacked on the transmitting mechanism in the feeding area, only the lowest one of the parts to be marked can be driven by the transmitting mechanism to move from the feeding area to the processing area via the interval along the horizontal path, and the rest of the multiple parts to be marked are blocked in the feeding area by the part blocking structure, so as to accomplish the function of automatically sending the parts to be marked into the processing area one by one. As a result, the laser marking feeding device of the disclosure has an advantage of simplifying the transmitting path of automatically feeding or the device structure.

DETAILED DESCRIPTION

Figure 1:
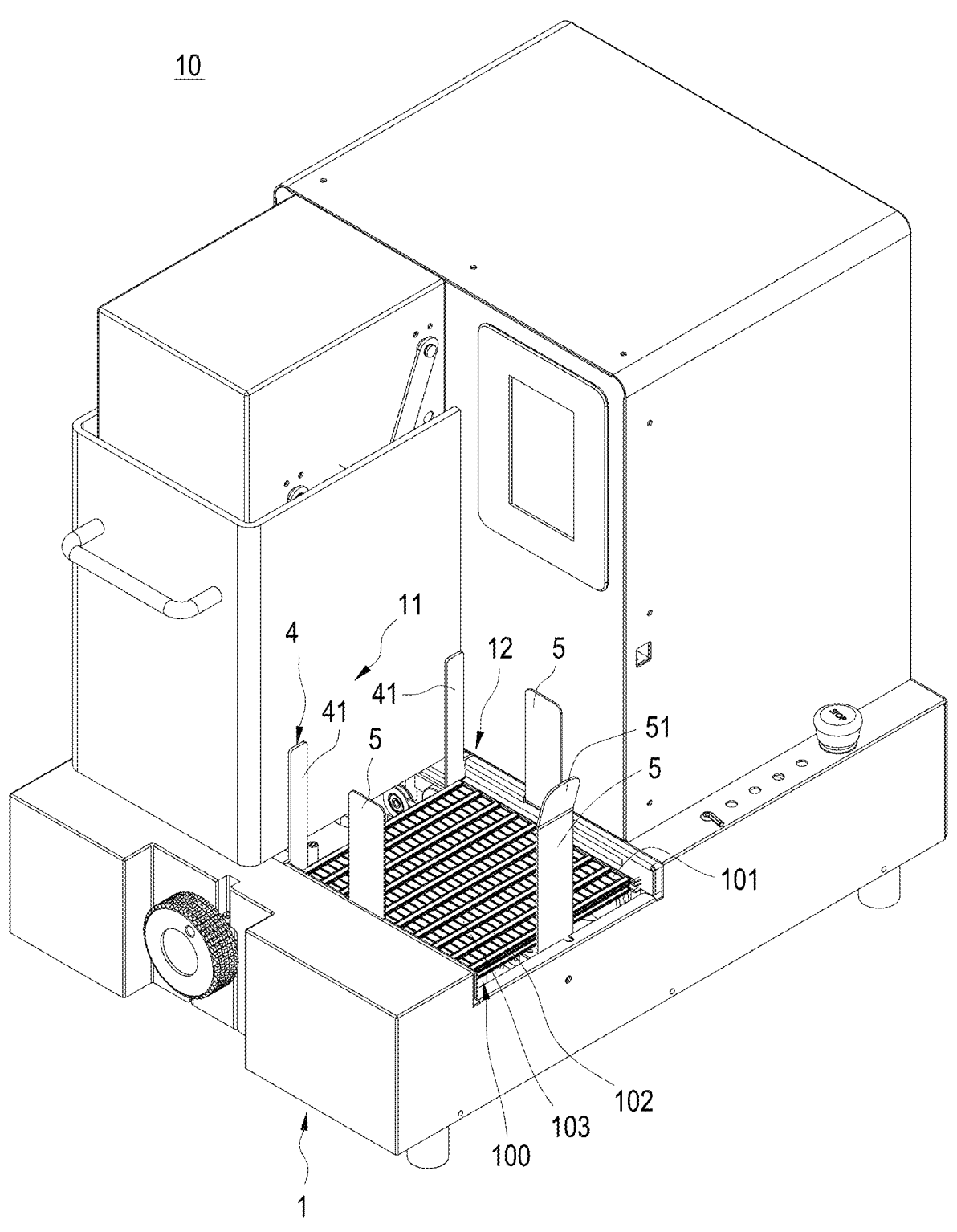
FIG. 1 is a perspective schematic view of the laser marking feeding device of the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIGS. 1-10. The disclosure provides a laser marking feeding device 10 includes a device body 1, a laser marking machine 2, a transmitting mechanism 3 and a part blocking structure 4.

As shown in FIGS. 1-2, 5-6 and 8-10, the laser marking feeding device 10 is used for multiple parts to be marked 100. Each part to be marked 100 has two transverse part belts 101 formed on two opposite sides thereof, multiple longitudinal part belts 102 connected between the two transverse part belts 101 and multiple materials to be laser marked 103 connected between the longitudinal part belts 102.

As shown in FIGS. 1-2, 5-6 and 8-10, the device body 1 is disposed with a processing area 11 and a feeding area 12 disposed on a side of the processing area 11.

Figure 2:
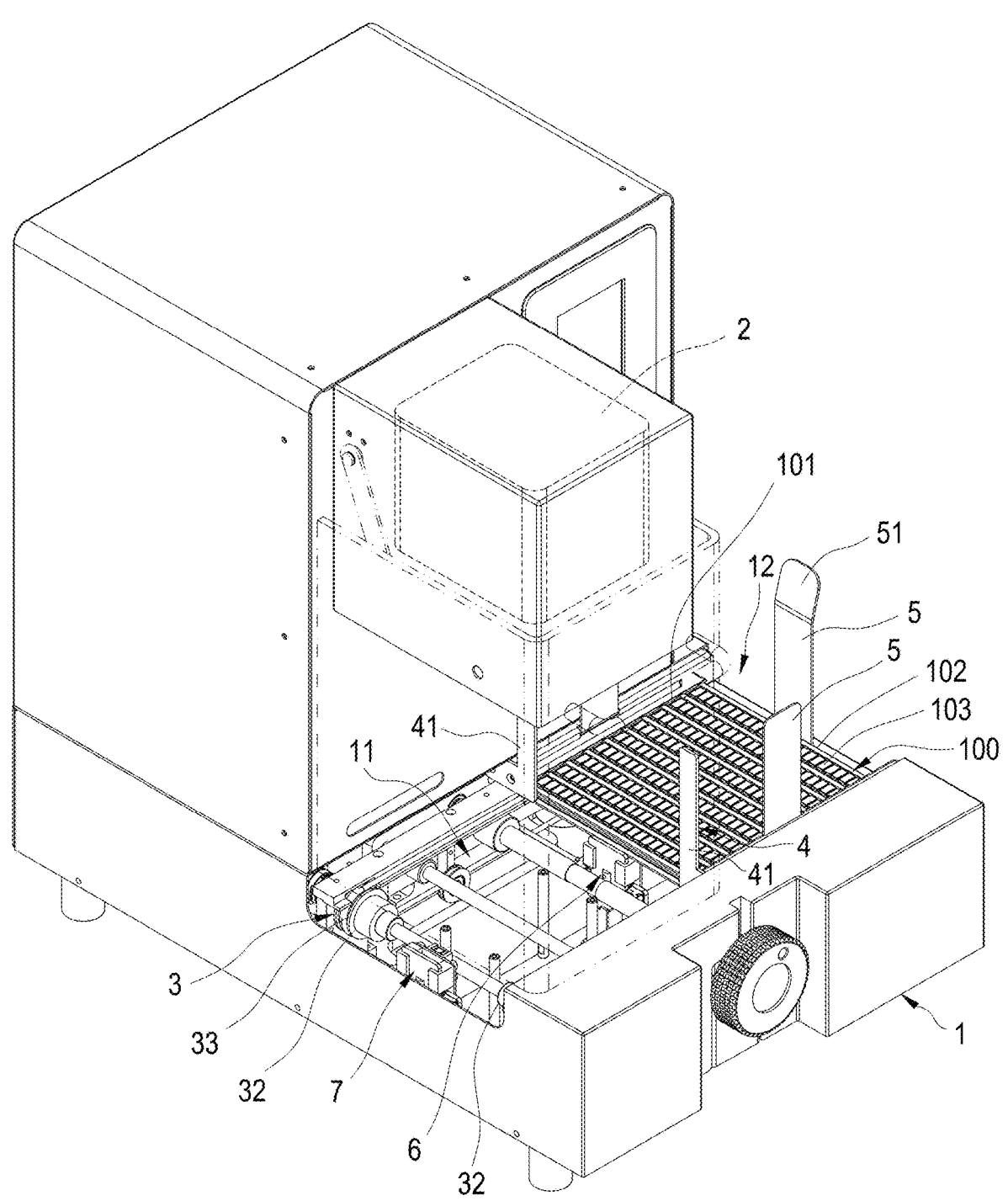
FIG. 2 is another perspective schematic view of the laser marking feeding device of the disclosure.
Figure 3:
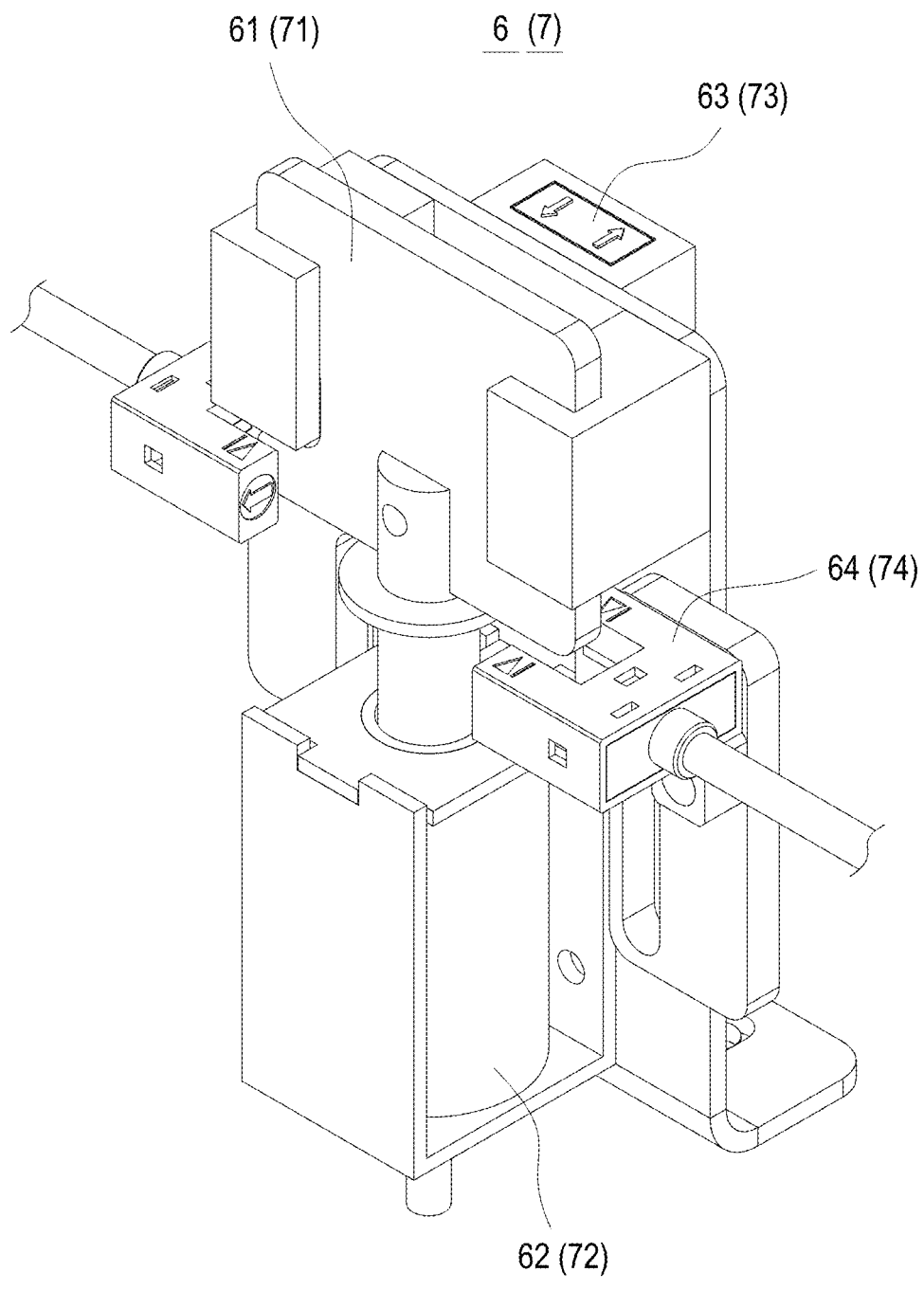
FIG. 3 is a perspective schematic view of the first (second) elevated blocking sheet module of the disclosure.
Figure 5:
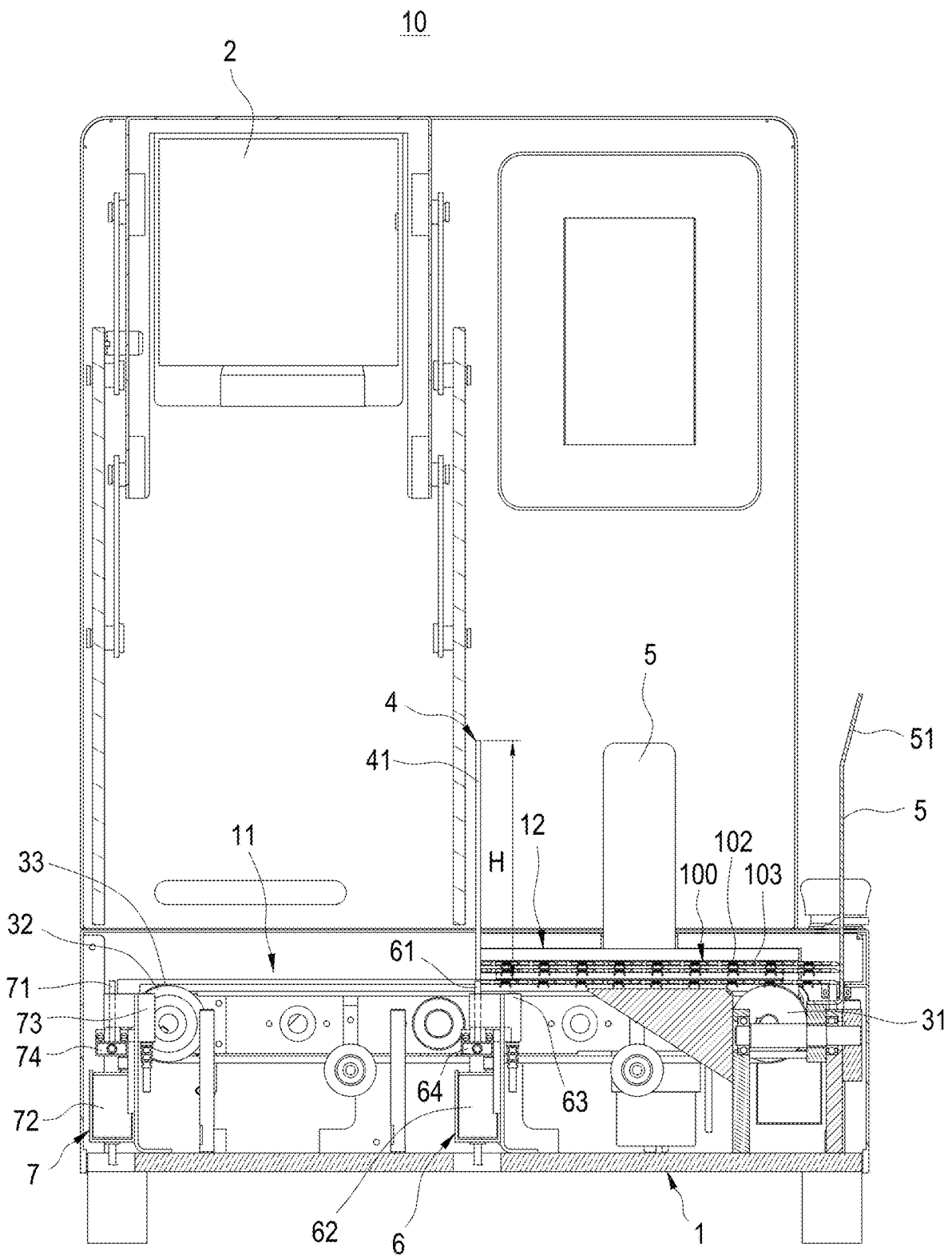
FIG. 5 is a cross-sectional view of the first using status of the laser marking feeding device of the disclosure.
Figure 9:
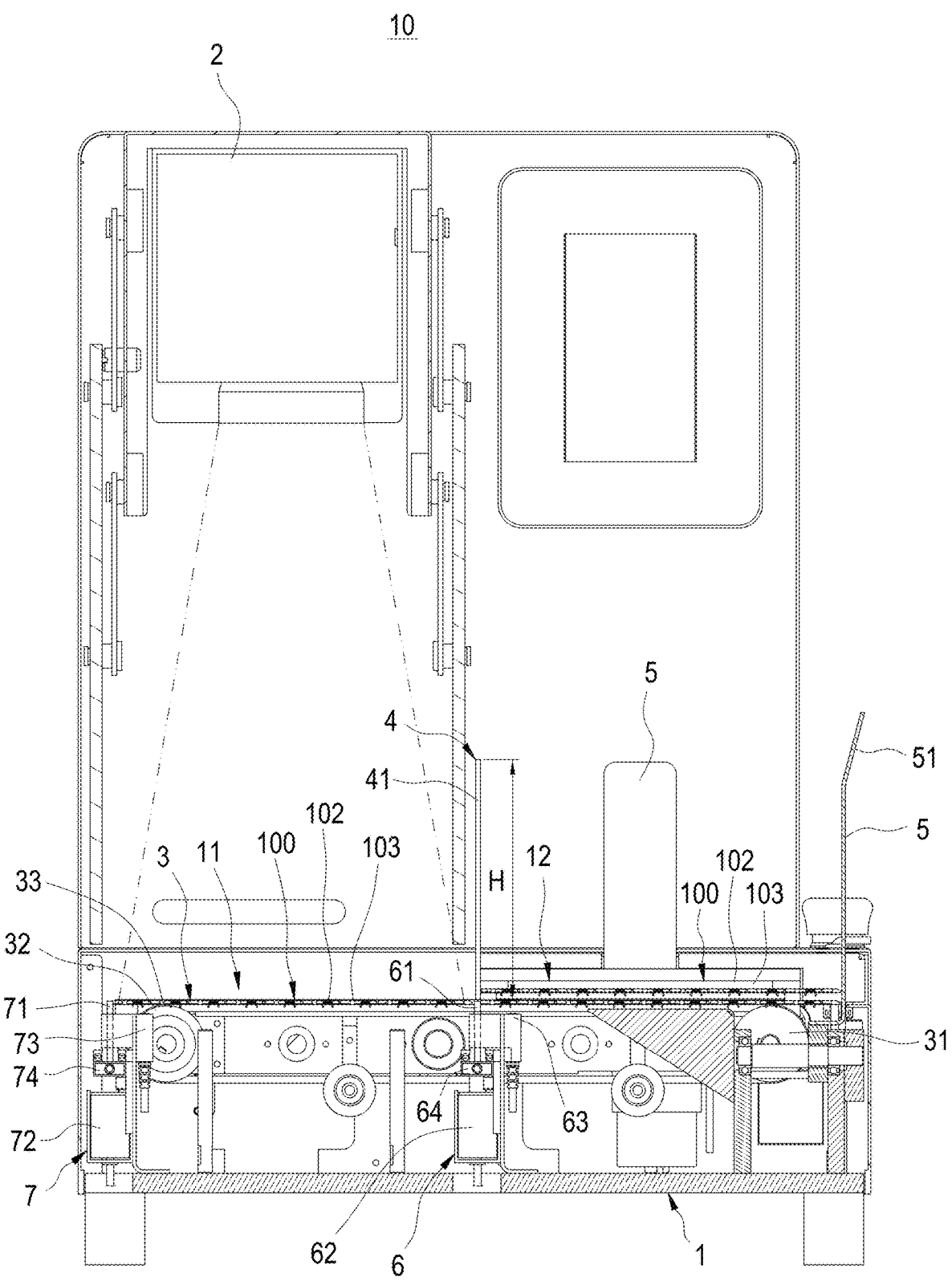
FIG. 9 is a cross-sectional view of the third using status of the laser marking feeding device of the disclosure.

As shown in FIGS. 2, 5 and 9, the laser marking machine 2 is installed in the processing area 11. The laser marking machine 2 is used for laser engraving surfaces of the multiple materials to be laser marked 103.

As shown in FIGS. 2, 5-6 and 8-10, the transmitting mechanism 3 is installed in the processing area 11 and the feeding area 12 and disposed under the laser marking machine 2. The transmitting mechanism 3 is used for transmitting the parts to be marked 100 from the feeding area 12 to the processing area 11 along a horizontal path.

In detail, the transmitting mechanism 3 includes two driving wheels 31 and two driven wheels 32, which are pivoted to the device body 1 and disposed on two opposite sides of the processing area 11 and the feeding area 12, and two tracks 33 separately wrapping outsides of each driving wheel 31 and each driven wheel 32 and following each driving wheel 31 to rotate. One of the driving wheels 31, one of the driven wheels 32 and one of the tracks 33 are disposed on one side of the processing area 11 and the feeding area 12, and the other one of the driving wheels 31, the other one of the driven wheels 32 and the other one of the tracks 33 are disposed on the other side of the processing area 11 and the feeding area 12. The two transverse part belts 101 are placed on the two tracks 33 to make the transmitting mechanism 3 able to transmit the parts to be marked 100 from the feeding area 12 to the processing area 11 along the horizontal path. The track 33 of the embodiment may be a belt or a chain.

As shown in FIGS. 1-2, 5-6 and 8-10, the part blocking structure 4 is disposed between the processing area 11 and the feeding area 12 and disposed over the transmitting mechanism 3. A height H of the part blocking structure 4 is greater than the sum of thicknesses of the multiple parts to be marked 100. An interval S greater than a thickness of one of the parts to be marked 100 and less than thicknesses of two of the parts to be marked 100 exists between the part blocking structure 4 and the transmitting mechanism 3.

Further, the part blocking structure 4 includes two upright blocking plates 41 fixed to the device body 1 and disposed over the two tracks 33. The height H is a height of each upright blocking plate 41. The interval S is formed between the two tracks 33 and the two upright blocking plates 41.

When the multiple parts to be marked 100 are stacked on the transmitting mechanism 3 of the feeding area 12, only the lowest one of the parts to be marked 100 can be driven by the transmitting mechanism 3 to move from the feeding area 12 to the processing area 11 via the interval S along the horizontal path. The rest of the multiple parts to be marked 100 are blocked in the feeding area 12 by the part blocking structure 4.

As shown in FIGS. 1-2, 5 and 8-10, the laser marking feeding device 10 further includes three limiting plates 5 fixed to the device body 1. One of the limiting plates 5 and the two upright blocking plates 41 are disposed on a pair of two opposite sides of the feeding area 12 and its distal end is extended with a slant section 51 inclining upward gradually outward to be advantageous to stacking the multiple parts to be marked 100 on the transmitting mechanism 3 in the feeding area 12. The remaining two limiting plates 5 are disposed on another pair of two opposite sides of the feeding area 12.

As shown in FIGS. 2-10, the laser marking feeding device 10 further includes a first elevated blocking sheet module 6 disposed among the two tracks 33, the processing area 11 and the feeding area 12. The first elevated blocking sheet module 6 includes a first blocking sheet 61 and a first actuator 62 fixed to the device body 1 and driving the first blocking sheet 61 to be higher than or lower than the two tracks 33. The first blocking sheet 61 and the two upright blocking plates 41 are located on the same horizontal plane or disposed on a side of the two upright blocking plates 41, which is adjacent to the feeding area 12.

In addition, the first elevated blocking sheet module 6 further includes a first position sensor 63 and one or more second position sensors 64. The first position sensor 63 is installed on one side of the first actuator 62, which is adjacent to the feeding area 12. The first position sensor 63 is used for sensing the parts to be marked 100. The second position sensor 64 corresponds to the first blocking sheet 61 to be disposed and is used for sensing the first blocking sheet 61 being higher than or lower than the two tracks 33.

Figure 4:
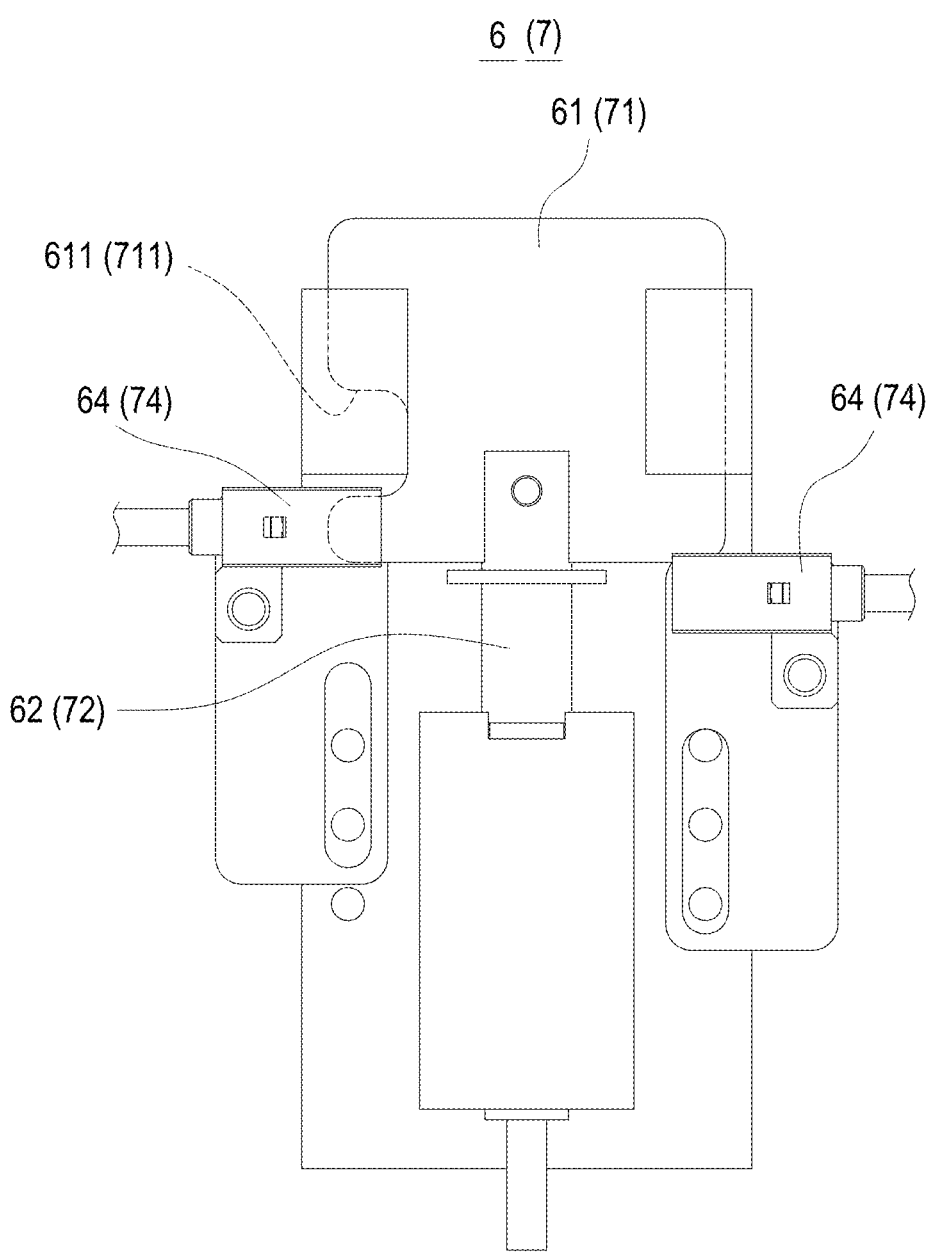
FIG. 4 is a schematic view of using status of the first (second) elevated blocking sheet module of the disclosure.

In detail, the second position sensor 64 of the embodiment is two in number. The first blocking sheet 61 is disposed with a first notch 611. One of the second position sensors 64 corresponds to the bottom edge of the first blocking sheet 61 to be disposed, and the other second position sensor 64 corresponds to the first notch 611 of the first blocking sheet 61 to be disposed. The second position sensors 64 may be infrared sensors or ultrasonic sensors. As shown in FIG. 4, when the first blocking sheet 61 is higher than the two tracks 33, the first blocking sheet 61 is higher than one of the second position sensors 64 to make the infrared rays of one of the infrared sensors or the ultrasonic waves of one of the ultrasonic sensors fail to be blocked to generate a first protrusion signal. The first blocking sheet 61 shades the other second position sensor 64 to make the infrared rays of the other infrared sensor or the ultrasonic waves of the other ultrasonic sensor blocked to generate a second protrusion signal. A processor (not shown in the figures) presets that the first blocking sheet 61 must be higher than the two tracks 33 by calculation and does not issue a warning when simultaneously receiving the first and second protrusion signals. Contrarily, the processor presets that the first blocking sheet 61 must be higher than the two tracks 33 by calculation and issues a warning by a buzzer (not shown in the figures) or a display (not shown in the figures) when simultaneously not receiving the first and second protrusion signals.

Figure 7:
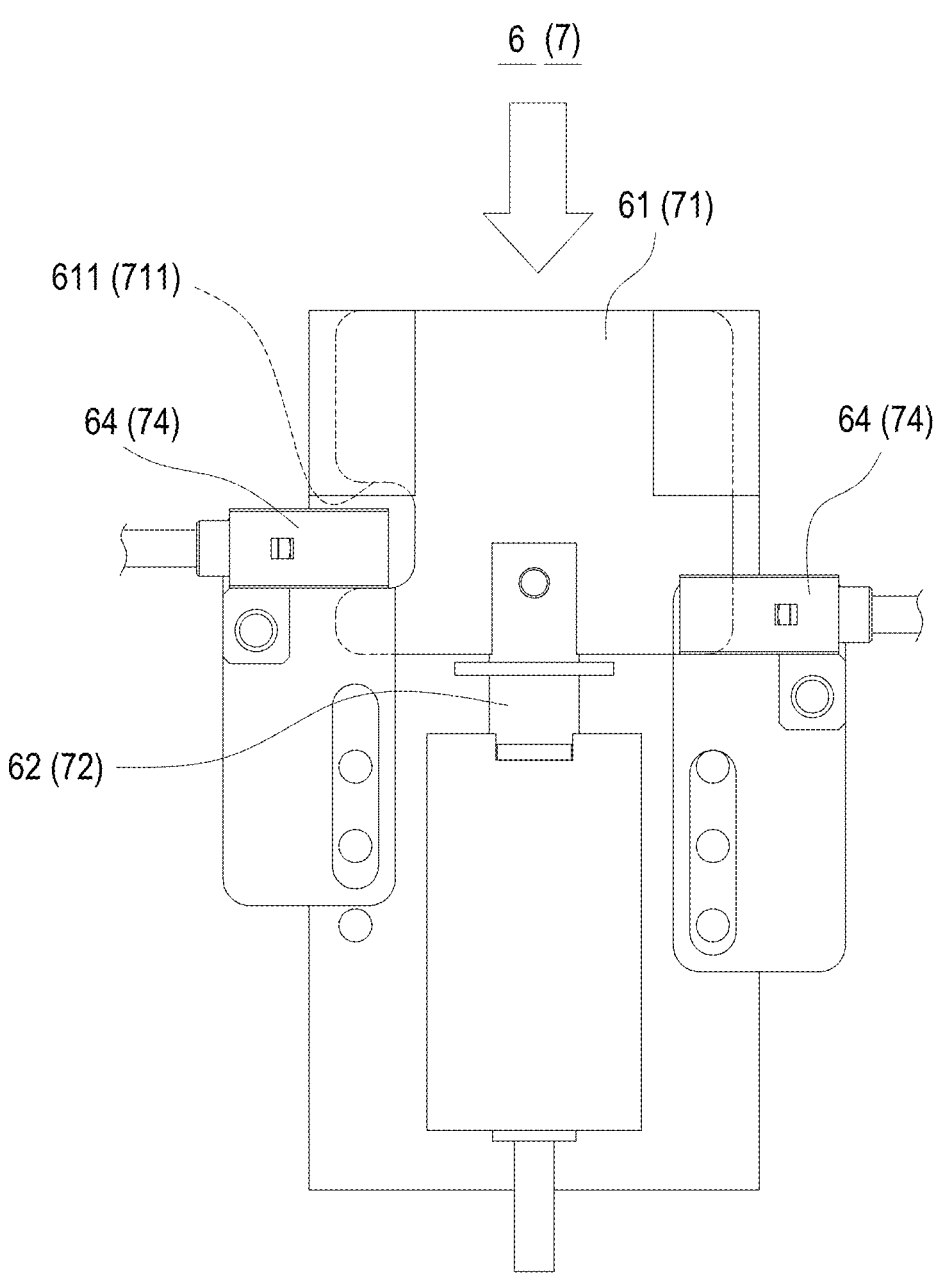
FIG. 7 is another schematic view of using status of the first (second) elevated blocking sheet module of the disclosure.

Furthermore, as shown in FIG. 7, when the first blocking sheet 61 is lower than the two tracks 33, the first blocking sheet 61 shades one of the second position sensors 64 to make the infrared rays of one of the infrared sensors or the ultrasonic waves of one of the ultrasonic sensors blocked to generate a first retraction signal. The other second position sensor 64 corresponds to the first notch 611 of the first blocking sheet 61 to make the infrared rays of one of the infrared sensors or the ultrasonic waves of one of the ultrasonic sensors fail to be blocked to generate a second retraction signal. The processor (not shown in the figures) presets that the first blocking sheet 61 must be lower than the two tracks 33 by calculation and does not issue a warning when simultaneously receiving the first and second retraction signals. Contrarily, the processor presets that the first blocking sheet 61 must be lower than the two tracks 33 by calculation and issues a warning by a buzzer (not shown in the figures) or a display (not shown in the figures) when simultaneously not receiving the first and second protrusion signals.

As shown in FIGS. 2-5 and 7-10, the laser marking feeding device 10 further includes a second elevated blocking sheet module 7 disposed between the two tracks 33 and on a side of the processing area 11, which is away from the first elevated blocking sheet module 6. The second elevated blocking sheet module 7 includes a second blocking sheet 71 and a second actuator 72 fixed to the device body 1 and driving the second blocking sheet 71 to be higher than or lower than the two tracks 33.

In addition, the second elevated blocking sheet module 7 further includes a third position sensor 73 and a fourth position sensor 74. The third position sensor 73 is installed on a side of the second actuator 72, which is adjacent to the processing area 11. The third position sensor 73 is used for sensing the parts to be marked 100. The fourth position sensor 74 corresponds to the second blocking sheet 71 to be disposed and is used for sensing the second blocking sheet 71 being higher than or lower than the two tracks 33.

In detail, the fourth position sensor 74 of the embodiment is two in number. The second blocking sheet 71 is disposed with a second notch 711. One of the fourth position sensors 74 corresponds to the bottom edge of the second blocking sheet 71 to be disposed, and the other fourth position sensor 74 corresponds to the second notch 711 of the second blocking sheet 71 to be disposed. The fourth position sensors 74 may be infrared sensors or ultrasonic sensors. As shown in FIG. 4, when the second blocking sheet 71 is higher than the two tracks 33, the second blocking sheet 71 is higher than one of the fourth position sensors 74 to make the infrared rays of one of the infrared sensors or the ultrasonic waves of one of the ultrasonic sensors fail to be blocked to generate a third protrusion signal. The second blocking sheet 71 shades the other fourth position sensor 74 to make the infrared rays of the other infrared sensor or the ultrasonic waves of the other ultrasonic sensor blocked to generate a fourth protrusion signal. The processor presets that the second blocking sheet 71 must be higher than the two tracks 33 by calculation and does not issue a warning when simultaneously receiving the third and fourth protrusion signals. Contrarily, the processor presets that the second blocking sheet 71 must be higher than the two tracks 33 by calculation and issues a warning by a buzzer or a display when simultaneously not receiving the third and fourth protrusion signals.

Furthermore, as shown in FIG. 7, when the second blocking sheet 71 is lower than the two tracks 33, the second blocking sheet 71 shades one of the fourth position sensors 74 to make the infrared rays of one of the infrared sensors or the ultrasonic waves of one of the ultrasonic sensors blocked to generate a third retraction signal. The other fourth position sensor 74 corresponds to the second notch 711 of the second blocking sheet 71 to make the infrared rays of the other infrared sensor or the ultrasonic waves of the other ultrasonic sensor fail to be blocked to generate a fourth retraction signal. The processor presets that the second blocking sheet 71 must be lower than the two tracks 33 by calculation and does not issue a warning when simultaneously receiving the third and fourth retraction signals. Contrarily, the processor presets that the second blocking sheet 71 must be lower than the two tracks 33 by calculation and issues a warning by a buzzer (not shown in the figures) or a display (not shown in the figures) when simultaneously not receiving the third and fourth protrusion signals.

Also, the first position sensor 63 will generate a first positioning signal when sensing the parts to be marked 100. The third position sensor 73 will generate a non-positioning signal when not sensing the parts to be marked 100. The fourth position sensor 74 will generate a descent signal when sensing the second blocking sheet 71 being lower than the two tracks 33. The first actuator 62 will drive the first blocking sheet 61 to be lower than the two tracks 33 when receiving the first position signal and the non-positioning signal or receiving the first positioning signal and the descent signal. Except the abovementioned two situations, the first actuator 62 only drives the first blocking sheet 61 to be higher than the two tracks 33.

In addition, the third position sensor 73 will generate a second positioning signal when sensing the parts to be marked 100. The first actuator 62 will drive the first blocking sheet 61 to be higher than the two tracks 33 when receiving the second positioning signal. The laser marking machine 2 will laser engrave the parts to be marked 100 when receiving the second positioning signal. The laser marking machine 2 will generate a laser finishing signal when finishing the laser engraving. The second actuator 72 will drive the second blocking sheet 71 to be lower than the two tracks 33 when receiving the second positioning signal and the laser finishing signal. Except the abovementioned situations, the second actuator 72 only drives the second blocking sheet 71 to be higher than the two tracks 33.

Figure 6:
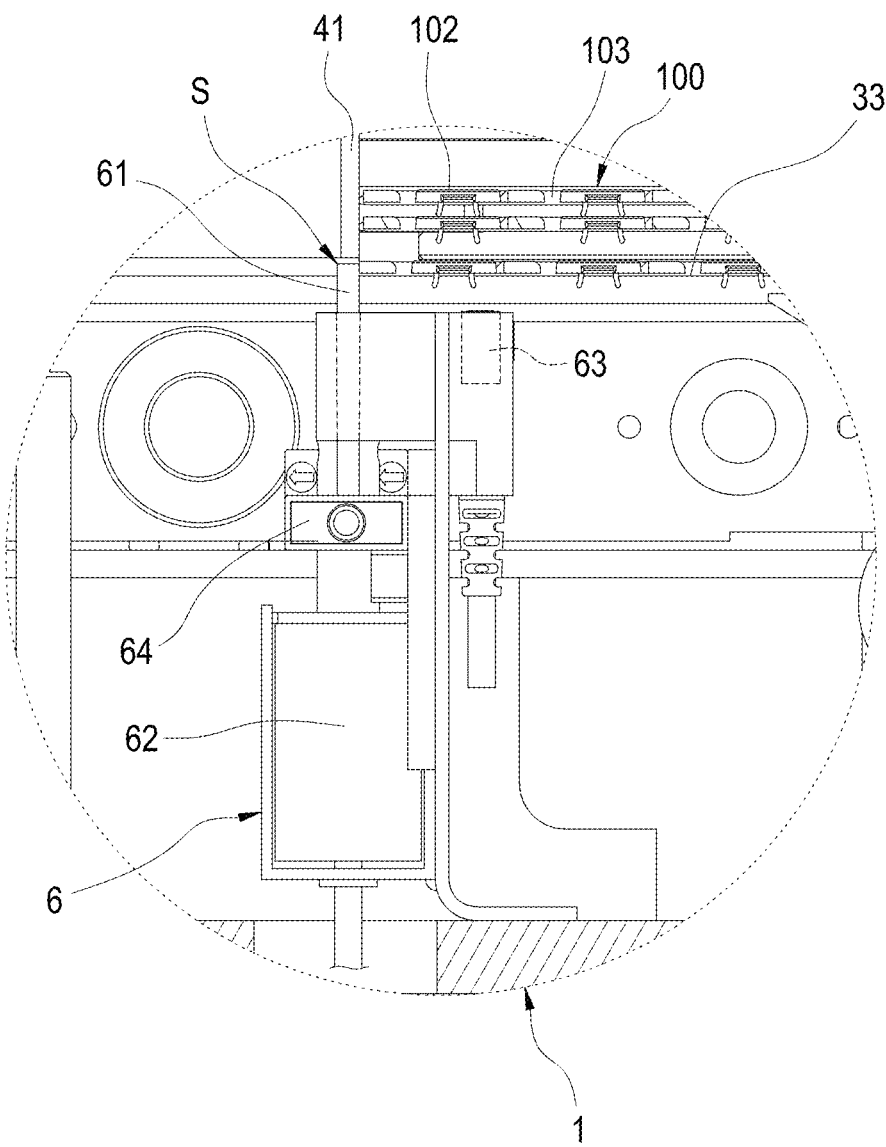
FIG. 6 is a partially enlarged schematic view of FIG. 4 of the disclosure.
Figure 8:
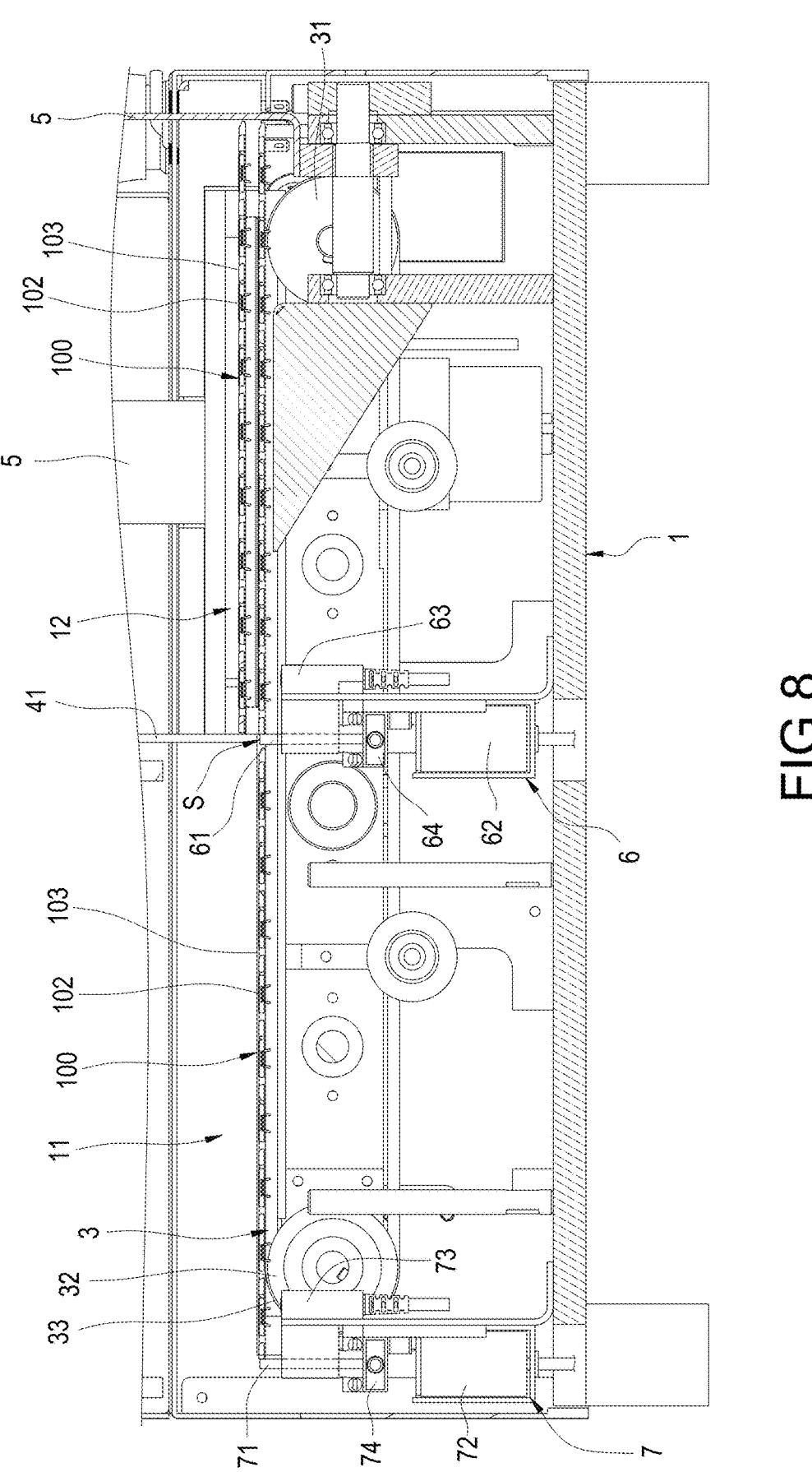
FIG. 8 is a cross-sectional view of the second using status of the laser marking feeding device of the disclosure.

As shown in FIGS. 5-6 and 8, which show the first and second using statuses of the laser marking feeding device 10 of the disclosure, first, the multiple parts to be marked 100 are stacked on the transmitting mechanism 3 located in the feeding area 12. The first position sensor 63 will generate the first positioning signal when sensing the parts to be marked 100. At this time, there is no part to be marked 100 in the processing area 11, so the third position sensor 73 fails to sense the parts to be marked 100 to generate the non-positioning signal. The first actuator 62 will drive the first blocking sheet 61 to be lower than the two tracks 33 when receiving the first positioning signal and the non-positioning signal. Then the two tracks 33 follow each driving wheel 31 to rotate, the lowest part to be marked 100 can be driven by the two tracks 33 to move from the feeding area 12 to the processing area 11 via the interval S along the horizontal path. The rest of the multiple parts to be marked 100 are blocked in the feeding area 12 by the part blocking structure 4.

Figure 10:
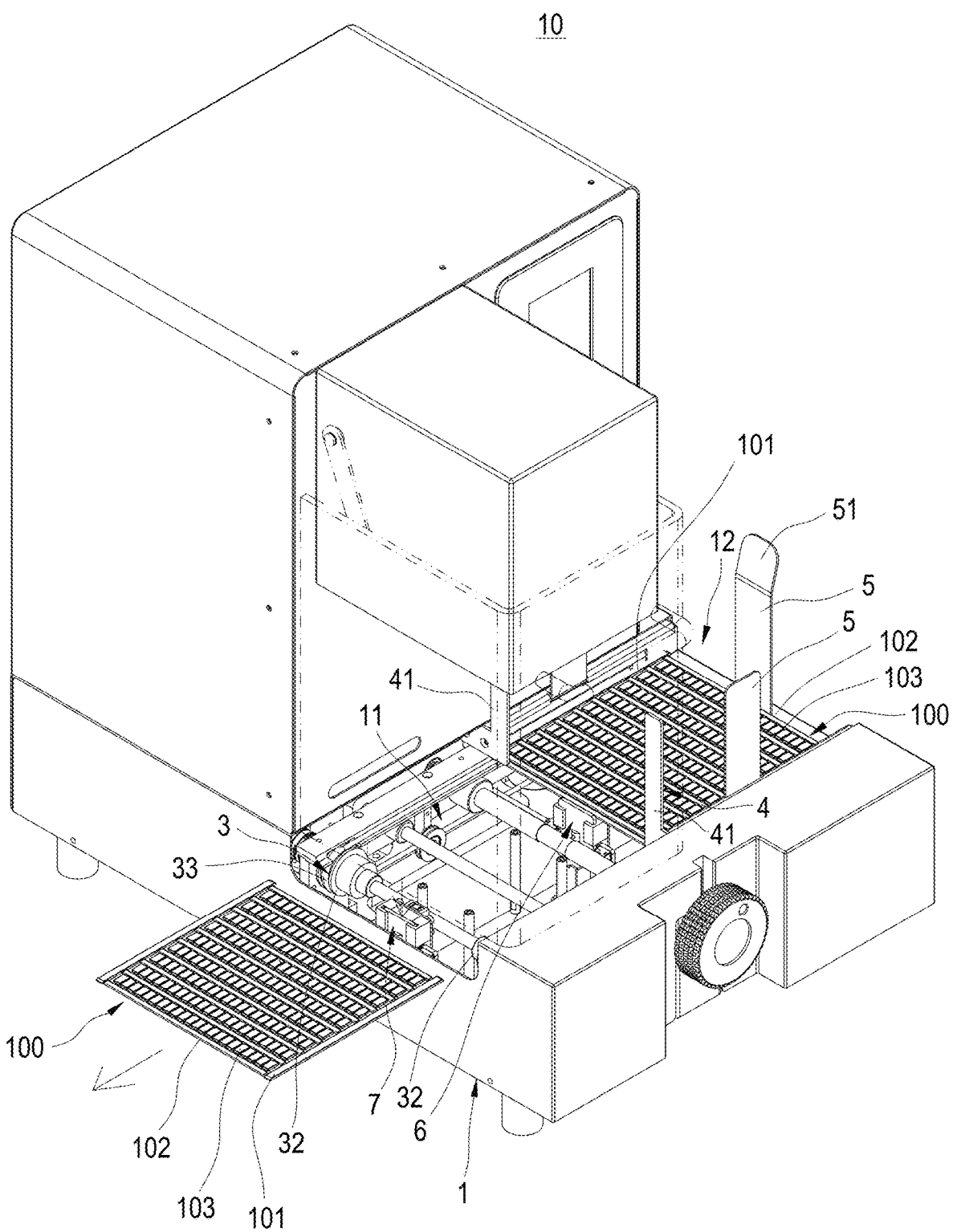
FIG. 10 is a cross-sectional view of the fourth using status of the laser marking feeding device of the disclosure.

As shown in FIGS. 9-10, which show the third and fourth using statuses of the laser marking feeding device 10 of the disclosure, finally, after the parts to be marked 100 enter the processing area 11, the third position sensor 73 senses that the parts to be marked 100 will generate the second positioning signal, and the first actuator 62 will drive the first blocking sheet 61 to be higher than the two tracks 33 when receiving the second positioning signal to prevent another part to be marked 100 from being sent to the processing area 11. The laser marking machine 2 will laser engrave the parts to be marked 100 when receiving the second positioning signal. The laser marking machine 2 will generate a laser finishing signal when finishing the laser engraving. The second actuator 72 will drive the second blocking sheet 71 to be lower than the two tracks 33 when receiving the second positioning signal and the laser finishing signal to make the finished parts to be marked 100 sent to a side of the processing area 11, which is away from the feeding area 12, so as to escape from the two tracks 33 to a collecting box (not shown in the figures).

In addition, the fourth position sensor 74 will generate the descent signal when sensing the second blocking sheet 71 being lower than the two tracks 33. The first actuator 62 will drive the first blocking sheet 61 to be lower than the two tracks 33 when receiving the first position signal and the descent signal to make another the lowest part to be marked 100 able to be driven by the two tracks 33 to move from the feeding area 12 to the processing area 11 via the interval S along the horizontal path. The rest of the multiple parts to be marked 100 are blocked in the feeding area 12 by the part blocking structure 4. When the finished part to be marked 100 are sent out of the processing area 11, another part to be marked 100 can be sent into the processing area 11 to accomplish the function of process automation.

Thereby, the laser marking feeding device 10 of the disclosure adopts the transmitting mechanism 3 to transmit the parts to be marked 100 from the feeding area 12 to the processing area 11 along the horizontal path, and then uses that the height H of the part blocking structure 4 is greater than the thicknesses of the multiple parts to be marked 100 and that an interval S greater than a thickness of one part to be marked 100 and less than thicknesses of two parts to be marked 100 exists between the part blocking structure 4 and the transmitting mechanism 3, after that, when the multiple parts to be marked 100 are stacked on the transmitting mechanism 3 in the feeding area 12, only the lowest one of the parts to be marked 100 can be driven by the transmitting mechanism 3 to move from the feeding area 12 to the processing area 11 via the interval S along the horizontal path, and the rest of the multiple parts to be marked 100 are blocked in the feeding area 12 by the part blocking structure 4, so as to accomplish the function of automatically sending the parts to be marked 100 into the processing area 11 one by one. As a result, the laser marking feeding device 10 of the disclosure has an advantage of simplifying the transmitting path of automatically feeding or the device structure.

While this disclosure has been described by means of specific embodiments, numerous modifications and variations could be made thereto by those skilled in the art without departing from the scope and spirit of this disclosure set forth in the claims.

What is claimed is:

1. A laser marking feeding device, used for multiple parts to be marked, the laser marking feeding device comprising:
   a device body, disposed with a processing area and a feeding area disposed on a side of the processing area;
   a laser marking machine, installed in the processing area;
   a transmitting mechanism, installed in the processing area and the feeding area and disposed under the laser marking machine, used for transmitting the parts to be marked from the feeding area to the processing area along a horizontal path, the transmitting mechanism comprises two driving wheels and two driven wheels, which are pivoted to the device body, and two tracks separately wrapping outsides of each driving wheel and each driven wheel, following each driving wheel to rotate, and parallel to each other at interval; and
   a part blocking structure, disposed between the processing area and the feeding area and disposed over the transmitting mechanism, a height of the part blocking structure being greater than thicknesses of the multiple parts to be marked, and an interval greater than a thickness of one of the parts to be marked and less than thicknesses of two of the parts to be marked existing between the part blocking structure and the transmitting mechanism;
   wherein the part to be marked comprises two transverse part belts formed on two opposite sides thereof, one of the two driving wheels, one of the two driven wheels, and one of the two tracks are arranged on a left side of the processing area and the feeding area, the other driving wheel, the other driven wheel, and the other track are arranged on a right side of the processing area and the feeding area, and the two transverse part belts are parallel to each other and respectively placed on the two tracks;
   wherein the part blocking structure comprises two upright blocking plates fixed to the device body and disposed over the two tracks, the height is a height of each upright blocking plate, and the interval is formed between the two tracks and the two upright blocking plates;
   wherein when the multiple parts to be marked are stacked on the transmitting mechanism in the feeding area, only the lowest one of the parts to be marked can be driven by the transmitting mechanism to move from the feeding area to the processing area via the interval along the horizontal path, and the rest of the multiple parts to be marked are blocked in the feeding area by the part blocking structure.

2. The laser marking feeding device of claim 1, further comprising three limiting plates fixed to the device body, wherein one of the limiting plates and the two upright blocking plates are disposed on a pair of two opposite sides of the feeding area and its distal end is extended with a slant section inclining upward gradually outward, and remaining two limiting plates are disposed on another pair of two opposite sides of the feeding area.

3. The laser marking feeding device of claim 1, further comprising a first elevated blocking sheet module disposed among the two tracks, the processing area and the feeding area, wherein the first elevated blocking sheet module comprises a first blocking sheet and a first actuator fixed to the device body and driving the first blocking sheet to be higher than or lower than the two tracks, and the first blocking sheet and the two upright blocking plates are located on the same horizontal plane or disposed on a side of the two upright blocking plates, which is adjacent to the feeding area.

4. The laser marking feeding device of claim 3, wherein the first elevated blocking sheet module further comprises a first position sensor, the first position sensor is installed on one side of the first actuator, which is adjacent to the feeding area, and the first position sensor is used for sensing the parts to be marked.

5. The laser marking feeding device of claim 3, wherein the first elevated blocking sheet module further comprises at least one second position sensors, the second position sensor corresponds to the first blocking sheet to be disposed and is used for sensing the first blocking sheet being higher than or lower than the two tracks.

6. The laser marking feeding device of claim 4, further comprising a second elevated blocking sheet module disposed between the two tracks and on a side of the processing area, which is away from the first elevated blocking sheet module, wherein the second elevated blocking sheet module comprises a second blocking sheet and a second actuator fixed to the device body and driving the second blocking sheet to be higher than or lower than the two tracks.

7. The laser marking feeding device of claim 6, wherein the second elevated blocking sheet module further comprises a third position sensor, the third position sensor is installed on a side of the second actuator, which is adjacent to the processing area, and the third position sensor is used for sensing the parts to be marked.

8. The laser marking feeding device of claim 7, wherein the second elevated blocking sheet module further comprises a fourth position sensor, and the fourth position sensor corresponds to the second blocking sheet to be disposed and is used for sensing the second blocking sheet being higher than or lower than the two tracks.

9. The laser marking feeding device of claim 8, wherein the first position sensor generates a first positioning signal when sensing the parts to be marked, the third position sensor generates a non-positioning signal when not sensing the parts to be marked, the fourth position sensor generates a descent signal when sensing the second blocking sheet being lower than the two tracks, and the first actuator drives the first blocking sheet to be lower than the two tracks when receiving the first position signal and the non-positioning signal or receiving the first positioning signal and the descent signal.

10. The laser marking feeding device of claim 9, wherein the third position sensor generates a second positioning signal when sensing the parts to be marked, the first actuator drives the first blocking sheet to be higher than the two tracks when receiving the second positioning signal, the laser marking machine laser engraves the parts to be marked when receiving the second positioning signal, the laser marking machine generates a laser finishing signal when finishing the laser engraving, and the second actuator drives the second blocking sheet to be lower than the two tracks when receiving the second positioning signal and the laser finishing signal.

* * * * *